Aug. 23, 1966  J. H. ROMNEY ET AL  3,267,640
APPARATUS FOR AUTOMATICALLY CLOSING AND SEALING CARTON FLAPS
Filed May 28, 1963  11 Sheets-Sheet 8

INVENTORS.
JACK H. ROMNEY and
RONALD G. CAMPBELL
By
Christy, Parmelee & Strickland
Attorneys

FIG. 17.

INVENTORS.
JACK H. ROMNEY and
RONALD G. CAMPBELL
By Christy, Parmelee & Strickland
Attorneys United States Patent Office 3,267,640
Patented August 23, 1966

3,267,640
APPARATUS FOR AUTOMATICALLY CLOSING AND SEALING CARTON FLAPS
Jack H. Romney and Ronald G. Campbell, Butler, Pa., assignors to International Staple & Machine Company, Butler, Pa., a corporation of Pennsylvania
Filed May 28, 1963, Ser. No. 283,880
9 Claims. (Cl. 53—75)

The present invention relates to apparatus for closing the top flaps of a packed carton and sealing the top and bottom carton flaps. More specifically, such apparatus is constructed to perform the flap closing and sealing operations automatically as the carton moves therethrough.

As is well known in the art, corrugated paper box materials are blanked and creased for folding into carton bodies whose top and bottom faces are closed by overlapping side and end flaps which are secured in place by suitable means, such as staples, tape or glue. In the present invention staples are employed. However, many features of the invention may be employed in apparatus using tape or glue as the sealing means.

Where a plurality of articles or a single article are packed in a carton, the carton comes to the packing table or conveyor with the carton body assembled and the bottom flaps are first closed in overlapping position before mounting the carton upon the conveyor with the folded flaps engaging the conveyor. The carton is then packed with the preselected articles and the carton, with upstanding side and end top flaps in upright position, is passed to the apparatus of the invention for closing the top flaps and sealing the top and bottom flaps in position.

Not infrequently the carton bodies are not always of the same size, that is, the length, width and height of the cartons are variable. The apparatus of the invention, upon receipt of a carton at the entrance end of the apparatus, will automatically adjust its flap closing and sealing means to the carton height before processing the packed carton therethrough.

To accommodate variations in width of the carton, the apparatus must first be manually adjusted to accommodate maximum carton width and will thereafter automatically accommodate variations from minimum to maximum width. This adjustment is provided through the conveyor belts engaging opposite side faces of the carton to move it through the apparatus.

The apparatus may be constructed to close and staple all closure flap constructions, the principal forms of which are referred to as center slot, partial overlap and full overlap. The apparatus disclosed herein is constructed to accommodate center slot cartons, but may be modified as herein discussed to accommodate the other forms of carton flap closure.

One object of the invention is to provide apparatus for automatically closing the top flaps of a packed carton and to staple the top and bottom flaps in place during passage of the carton through the apparatus.

Another object of the invention is to provide such apparatus with means for automatically positioning the flap closing and stapling mechanisms in accordance with the varying height of the body of the entering carton.

Another object of the invention is to provide adjustable means for automatically positioning cartons of variable width entering the apparatus relative to the flap closing and stapling means, for stapling at any preselected position between the center and the side of the carton.

A further object of the invention is to provide automatic controls for spacing the carton flap staples in accordance with the varying length of the cartons.

These and other objects of the invention will be made apparent from the following description and the drawing forming a part thereof, wherein.

GENERAL

Figure 1:
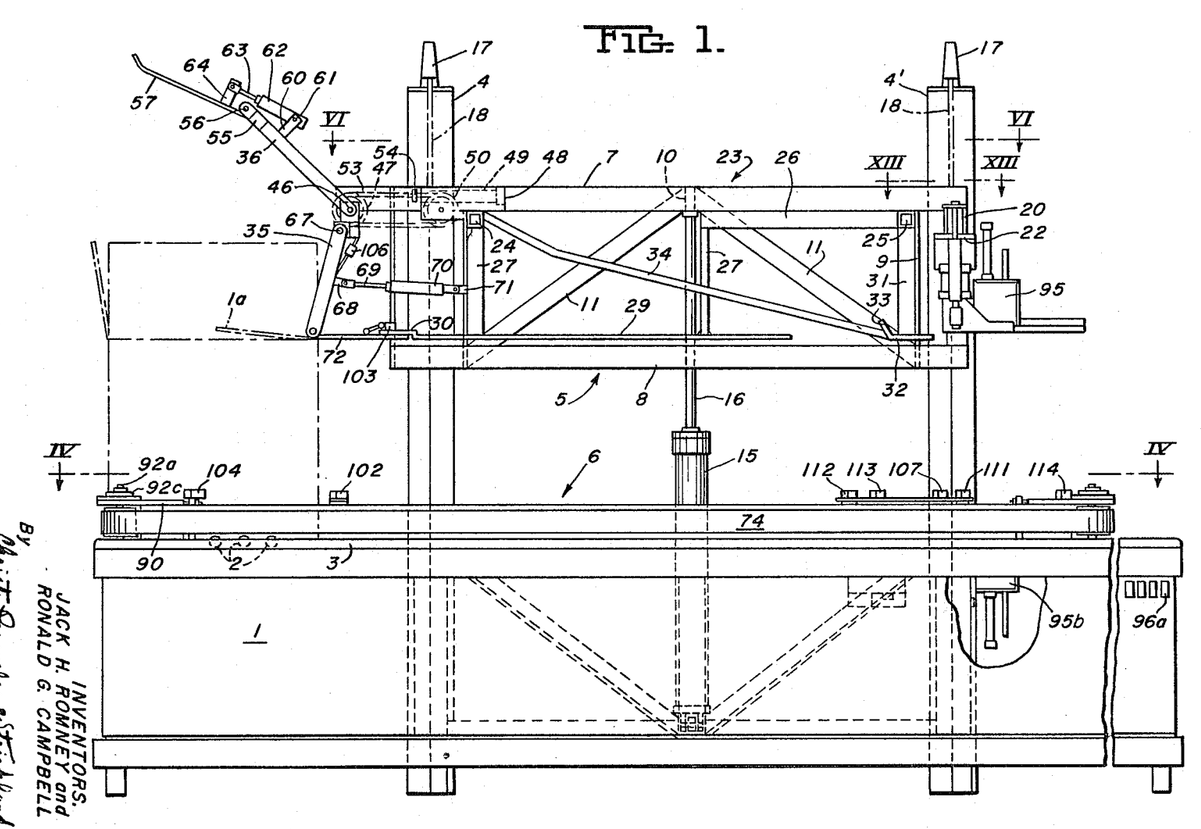
FIG. 1 shows a front elevation of the apparatus with the carriage adjusted to the height of the entering carton.
Figure 2:
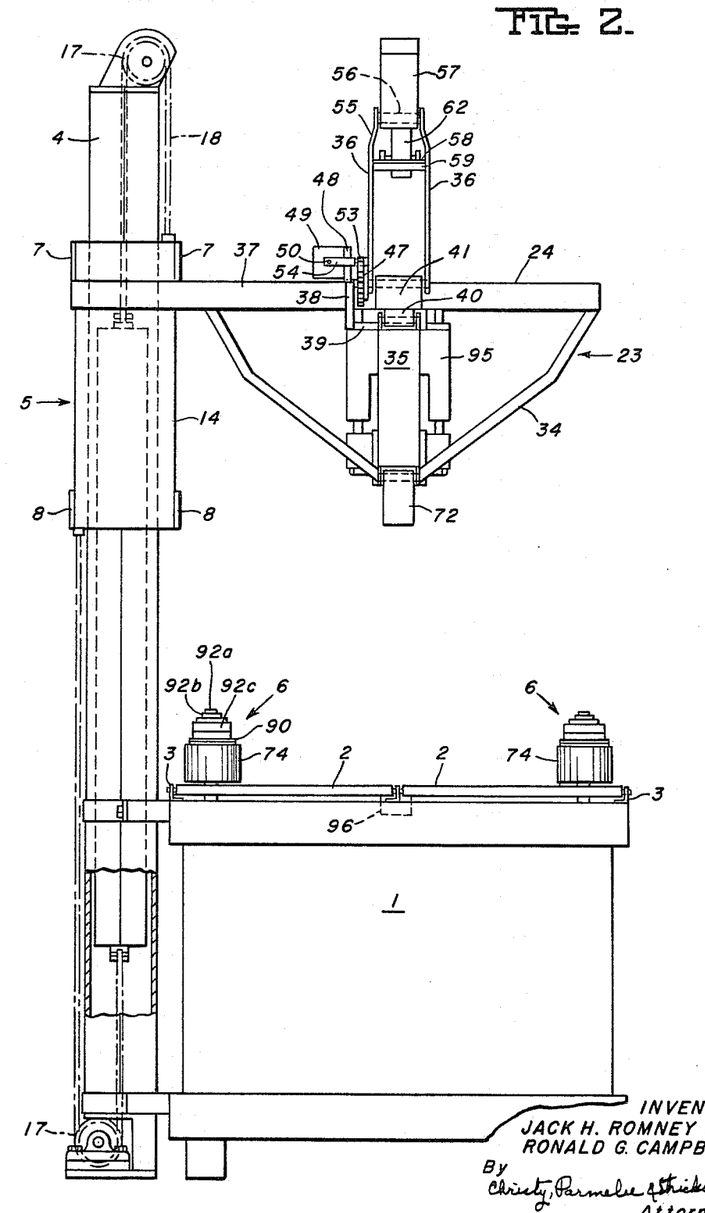
FIG. 2 shows an elevation of the carton entering end of the apparatus.
Figure 3:
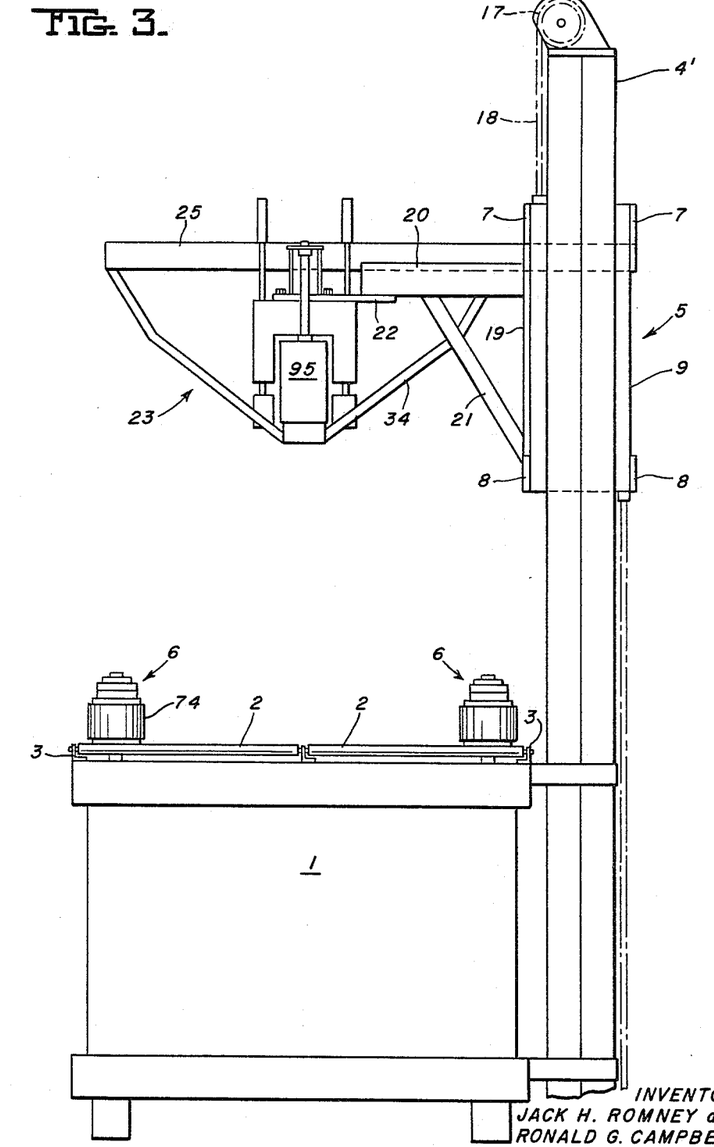
FIG. 3 shows a similar end elevation of the carton discharge end of the apparatus.

Referring now in detail to the drawing and particularly FIGS. 1, 2 and 3; the apparatus comprises a base portion 1 having a plurality of transversely disposed and longitudinally spaced carton conveying rollers 2 pivotally mounted in longitudinally extending rails 3 at opposite sides of the top of base 1. Adjacent the back of base portion 1 are longitudinally spaced columns 4 and 4' upon which is mounted a carriage indicated generally at 5, having vertical selective reciprocal movement for accommodation to the vertical height of a carton body A passing thereunder for closure of the side and end flaps and attachment together by suitably spaced staples. Extending longitudinally of the base 1 above the rollers 2 are a pair of transversely spaced belt members indicated generally as 6 for positioning the carton relative to the longitudinal center line of the base 1 and advancing the carton longitudinally of the base 1 and of the carriage 5 for automatically closing the top end and side flap of the carton and stapling together the closed top and bottom flaps in a preselected pattern.

THE CARRIAGE

Figure 6:
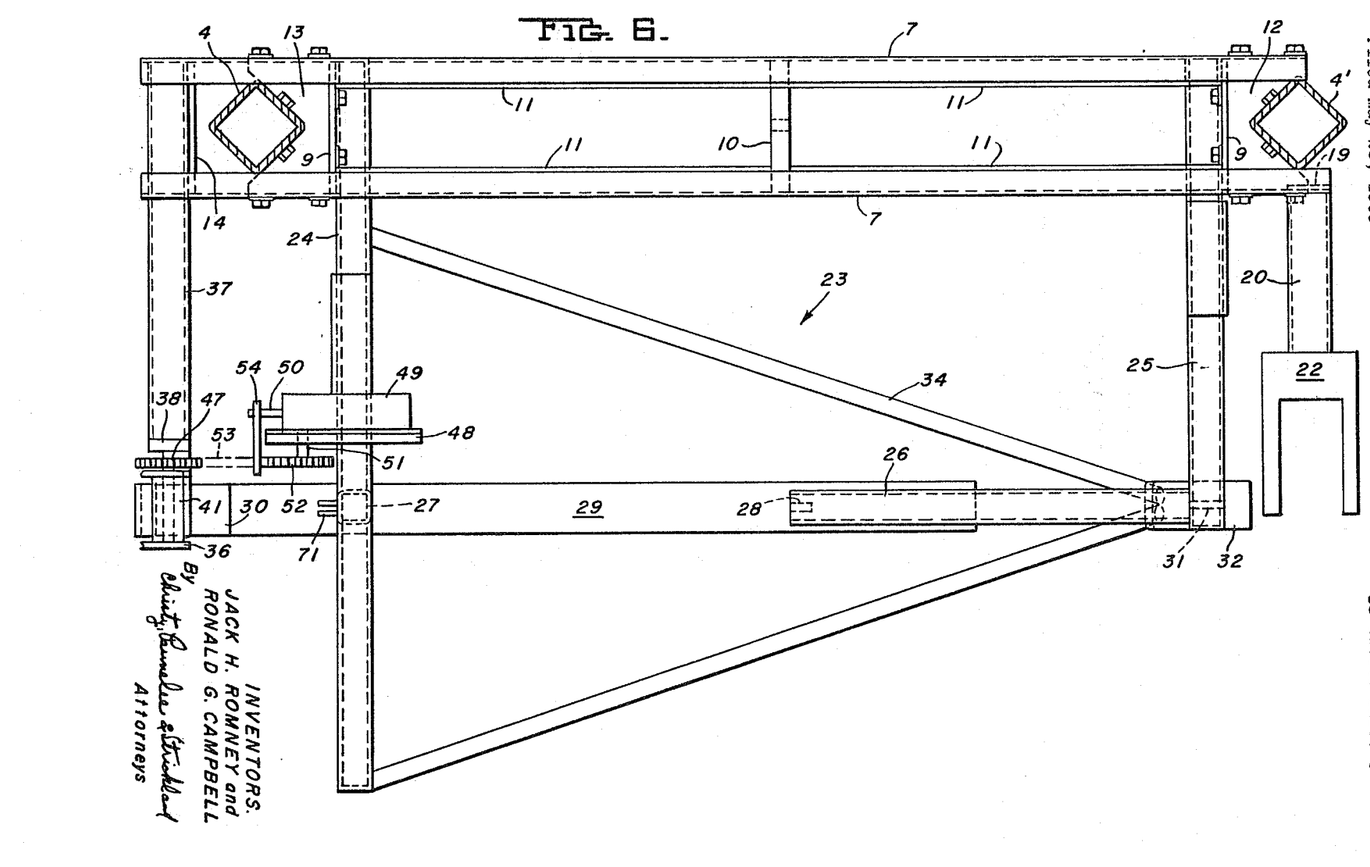
FIG. 6 shows a section taken on lines VI—VI of FIG. 1 illustrating the arrangement of bridge and carton flap closing and sealing mechanism suspended therefrom.

The carriage 5, as best illustrated in FIGS. 1 and 6 of the drawing comprises a rectangular frame having a pair of upper transversely spaced inturned channel members 7 and similar lower channel members 8 inter-connected by vertical members 9 providing a rigid frame. Intermediate the ends of channel members 7 is secured a transversely disposed trunnion member 10 with braces 11 extending downwardly from each end thereof to the members 9. Abutting members 9 and disposed between the flanges of channels 7 and 8 adjacent one end thereof is carriage roller bearing 12 housing rollers 12a engaging the adjacent column 4'. Inwardly of the opposite ends of channels 7 and 8 is a carriage roller bearing 13 housing similar rollers engaging the adjacent column 4. Outwardly of bearing 13 and in spaced relation to the opposite face of the latter column 4 is a vertically extending member 14 maintaining the carriage channels in fixed relation between columns 4 and 4'. Mounted upon base 1 is a suitable hydraulic cylinder 15 having a movable piston 16 therein connected with trunnion member 10. Preferably each column 4 and 4' has a chain roller 17 adjacent the top and bottom thereof over which are trained suitable chains 18 within which is mounted a suitable counterweight aiding and controlling movement of piston 16 in raising and lowering the carriage 5 as hereinafter discussed. Adjacent the right end of carriage 5, as viewed in FIG. 1, the front channel 7 is connected by a vertical strut 19, adjacent the upper end of which is a forwardly extending member 20 welded to strut 19 and provided with a lower brace 21. Extending outwardly from the outer end of member 20 and connected thereto is a suitable bracket 22 for a purpose hereinafter discussed.

Suspended from the carriage 5 and integrally connected for movement therewith is a carton side flap closer assembly indicated generally at 23. Such assembly 23 comprises an elongated member 24 extending outwardly from beneath carriage members 7 and preferably welded thereto and to adjacent member 9 at the left side of carriage 5 as viewed in FIG. 1. Similarly extending from adjacent the right side of the carriage is a shorter member 25 which may be welded to the carriage members 7 and adjacent member 9. Secured adjacent the outer end of member 25 and extending therefrom towards member 24 is a member 26. Depending from intermediate the ends of member 24 and secured thereto is a member 27. Depending from the member 26 and in substantial alignment with member 27 is a member 28 whose lower end is in substantially the horizontal plane of the lower end of member 27. Extending longitudinally between and extending beyond the lower ends of members 27 and 28 is a member 29. The left end of member 29, beyond member 27, is upwardly offset at 30 for a portion of its outer length for a purpose to be hereinafter discussed. Depending from member 25 adjacent the outer end thereof is a member 31 having attached to the bottom thereof a member 32 whose lower face is in substantially the horizontal plane of the lower face of member 29 and is in alignment therewith. The inner end of member 32 is preferably upwardly offset at 33. Extending from member 24 is a V-shaped carton side flap closer bar 34 having its apex attached to portion 33 of member 32 and within the horizontal plane of the lower face thereof.

CARTON HEIGHT SENSING BAR AND REAR FLAP CLOSER

Referring now to FIGS. 1, 2, 6 and 7, as shown at the left end of carriage 5, there is disclosed a height sensing arm 35 and a carton rear flap closure arm 36. Secured beneath the left hand end of members 7 of carriage 5 is a member 37 which extends outwardly therefrom. Mounted upon the outer end of member 37, as a continuation thereof, is a bearing support for sensing arm 35 and rear flap closure arm 36. Such bearing support is comprised of the member 38 from the lower portion of which extends the bearing support member 39, having at one side thereof support member 40, to which is secured bearing support member 41. Member 41 has an opening therethrough counter-bored at each end to receive bearings. Member 40 has an opening therethrough which is counter-bored at each end to receive bearings. Disposed within member 41 is a suitable shaft 46 extending through bearings and upon which is mounted member 36. Mounted upon shaft 46 and secured to member 36 is a sprocket 47. Mounted upon member 24 and disposed transversely across the top thereof is a plate 48. Mounted upon the rear face of plate 48 is a suitable pneumatic cylinder 49 having a piston 50 therein. Mounted upon plate 48 by means of a shaft 51 is an idler sprocket 52 in substantial alignment with sprocket 47. A chain 53 is trained over said sprocket and a clamp 54 is connected to chain 53 and piston 50.

The rear closure arm 36, as shown in FIG. 1, comprises spaced arms receiving between them at one end the bearing member 41 and is attached thereto by shaft 46. Adjacent their opposite ends the spaced arms are offset inwardly at 55 and connected by a suitable pin 56 upon which is mounted the flap. The inner end of the flap 57 is provided with a semi-circular portion embracing pin 56. Intermediate the ends of arm 36 are secured bracing members 58 and 59. Intermediate said bracing members and secured to the arm of 36 are spaced trunnion supports 60 having openings therein receiving a pin 61. Flap 57 is selectively rotatable independently of member 36, by means of a pneumatic cylinder 62 which is trunnioned upon supports 60. A piston 63 within cylinder 62 is pivotally connected with flap 57 by trunnion supports 64 secured to the flap intermediate the ends thereof.

Carton height sensing arm 35 may be of any suitable construction and is shown herein as a channel shaped member having the web removed adjacent each end thereof. Member 35 has its web disposed for engagement by the body of a carton entering the apparatus and at the upper end of the member the flanges have aligned openings therein receiving the bearing support 40 and secured thereto by a suitable pin 67 permitting pivotal movement of the member 35. Intermediate the ends of member 35 and between the flanges thereof is a member 68 to be received by the yoke end of piston 69 disposed in pneumatic cylinder 70. The rear end of cylinder 70 is pivotally connected with adjacent member 27 having a trunnion 71 extending therefrom for the purpose. Pivotally mounted upon the lower end of member 35 is a flap 72. Normally the cylinder 70 holds the member 35 inclined outwardly and downwardly for a purpose to be hereinafter discussed.

CARTON CENTERING AND MOVING MEANS

Figures 4, 15:
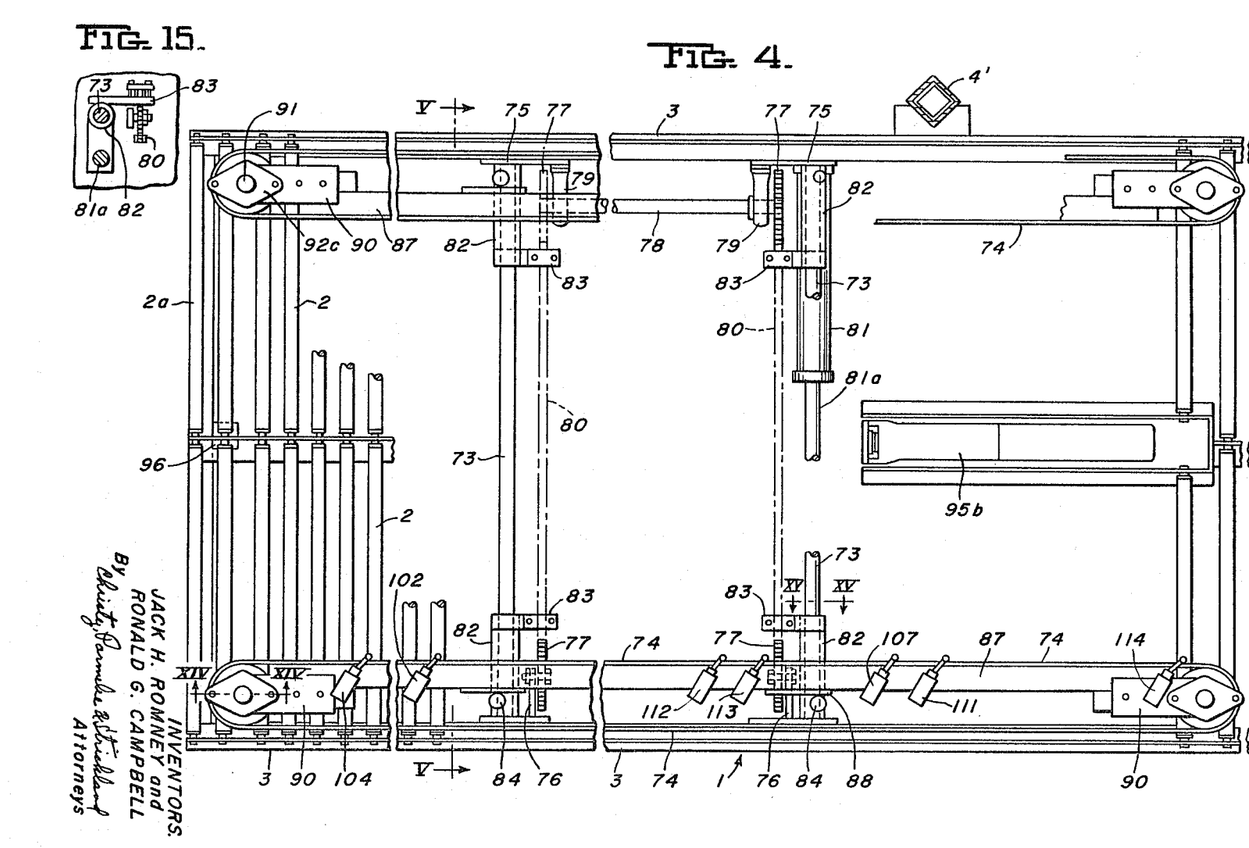
FIG. 4 shows a plan view of the carton positioning and driving belts on the base portion of the apparatus.
FIG. 15 shows section on lines XV—XV of FIG. 4.
Figure 5:
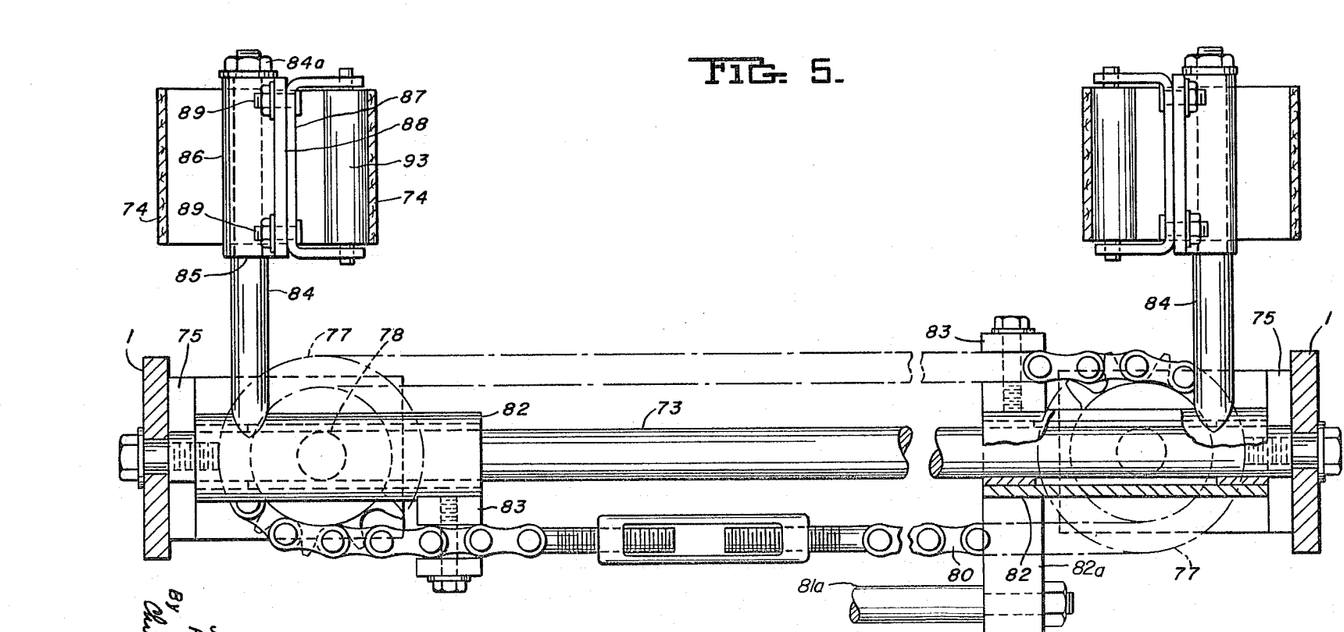
FIG. 5 shows a section taken on lines V—V of FIG. 4.

Referring now to FIGS. 1, 4 and 5; a carton centering and moving device indicated generally at 6 is disposed longitudinally of the base 1. Such a device is adjustable as to the width of the carton and for the purpose of positioning the carton top and bottom flaps relative to the staple applying heads. As best shown in FIGS. 1, 4 and 5 the stapling heads are located upon the longitudinal center line of the base and the driving belts are transversely adjustable relative to the base to position the longitudinal center line of the carton relative to the center line of the base, as hereinafter discussed.

Referring now to FIG. 4, two centering guide shafts 73 are disposed transversely of the base 1 and spaced longitudinally of the base 1 intermediate the ends of the belts 74 extending longitudinally of the base to adjacent each end thereof. The ends of shafts 73 are mounted in suitable supporting members 75 attached to the base and maintaining the shafts below the bottom plane of rollers 2 of the base. Adjacent one end of each shaft 73, and supported upon a suitable supporting member 76 secured to the base, is an idling sprocket 77 whose axis of rotation is at right angles to the adjacent shaft 73. Adjacent the opposite ends of shafts 73 and extending longitudinally of the base 1 is a centering shaft 78 rotatably mounted in suitable pillow blocks 79. Mounted on opposite ends of shaft 78 for rotation therewith are sprockets 77 transversely aligned with the similar sprockets at the opposite side of base 1. A suitable drive chain 80 is trained over each transversely disposed pairs of sprockets 77. Thus shaft 78 insures each chain is simultaneously rotated about its sprockets and at uniform constant speeds. Disposed adjacent one end of one shaft 73 is a pneumatic cylinder 81 having a piston 81a therein providing reciprocal movement transversely of base 1. Mounted in spaced relation on each shaft 73 are sliding sleeve members 82 each having extending from one side thereof a clamping member 83. The clamping members are disposed between transversely spaced sprockets 77. As best shown in FIG' 5, one clamp member 83, of each shaft 73, engages the upper run of chain 80 and the other clamping member 83 engages the bottom run of the chain. As shown in FIG- URE 5 the piston 81a is secured at its outer end to a downward extension 82a of one of the sleeves 82 and movement of the piston in the cylinder 81 causes that sleeve to move back and forth on the shaft 73 on which it is mounted. This moves all of the sleeves since they are interconnected by the sprockets 77, the centering shaft 78 and the chains 80. Thus when the sleeves 82 on each shaft 73 are widely separated and at equal distances from the center line of base 1, rotation of the sprockets 77 in one direction draws the sleeves 82 together towards the longitudinal center line of the base and rotation of the sprockets 77 in the opposite direction separates the sleeves 82. By attaching sleeves 82 with the chain 80 at unqual distances from the ends of shafts 73 the sleeves or other structure attached thereto would meet at any preselected position, other than the longitudinal center line of the base.

Figure 14:
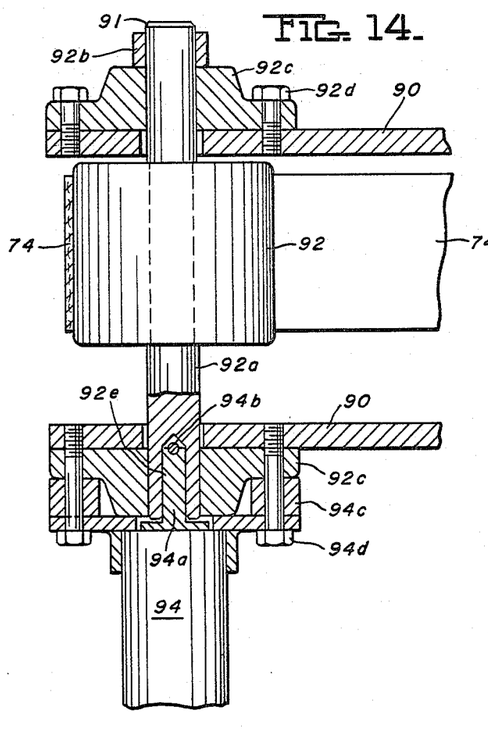
FIG. 14 shows section taken on lines XIV—XIV of FIG. 4.

For the purposes of the present invention and as best shown in FIGS. 4 and 5 the sleeves 82 are employed to move the belts 74 transversely across the top of base 1 to both position the cartons and to move the cartons over the base. Attached to each sleeve 82 is a rod member 84 which extends upwardly therefrom above the rollers 2 at the top of base 1. The upper end of each rod 84 is shouldered as at 85 and a suitable sleeve member 86 is slidabe thereover and positioned against said shoulder 85. Adjacent the inner opposing faces of the two sleeves 86, at each side of base 1, are disposed channel shaped members 87 with the flanges thereof opening toward the center line of base 1. Channels 87 extend longitudinally of each side of base 1 beyond each sleeve 86 and for substantially the full length of the belts 74. Channels 87 have the webs thereof connected with each adjacent sleeve 86 by means of a suitable plate member 88 extending beyond opposite sides of each sleeve 86 and welded thereto. The channels 87 may then be secured to plates 88 by any suitable means such as bolts 89. The sleeves 86 and channels 87 are held assembled to rod 84 by any suitable means, such as threading the outer end of rod 84 and mounting a nut and lock washer 84a on said threaded portion. As best seen in FIGS. 4 and 5, adjacent the ends of each channel 87 and secured to the channel web for extension rearwardly therefrom may be suitable upper and lower plate members 90. Adjacent the outer end of members 90 are suitable openings for reception of the shaft 91 of pulley 92 about which the belts 74 are trained. Between them these plate members 90 support the pulleys 92 at each end of each belt 74. As shown in FIG. 5, suitable backing rollers 93 are disposed in longitudinally spaced relation between the flanges of channels 87 for substantially the length of belts 74. These rollers 93 prevent deflection of the belts 74 when in engagement with a carton disposed therebetween. The belt pulleys at one end of base 1 are driven by suitable air motors attached to pulley shafts 91. As best shown in FIG. 14, the upper ends of shafts 91 has a shaft collar 92b holding the shaft in fixed relation to a flange bearing 92c secured to adjacent plate 90 by cap screws 92d. Shaft 91 depending below lower plate 90 extends therethrough and is counter-bored at 92e to receive motor 94 and drive shaft 94a. Such shaft 94a is held in place within shaft counter-bore 92e by a press fit and pin 94b. A cap plate 94c on motor 94 is secured to flange bearing 92c and plate 90 by cap screws 94d.

Figure 8:
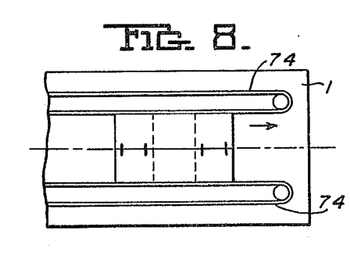
FIGS. 8, 9 and 10 illustrate flaps of center slot, partial overlap and full overlap cartons in relation to the longitudinal center line of the bed of the apparatus.
Figure 9:
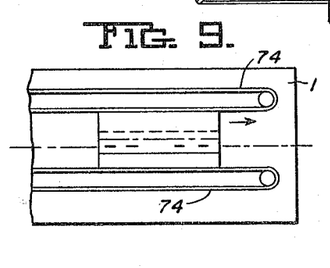
Figure 10:
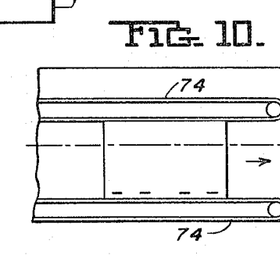
Figure 11:
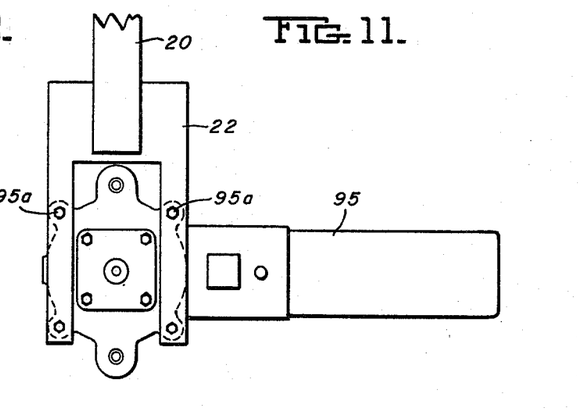
FIGS. 11 and 12 disclose adjustment of stapling guns for different carton flap arrangements.

As previously discussed, one function of the carton centering and moving means is to position a carton, regardless of width, in alignment with the top and bottom stapling mechanisms as may be required by the overlapped top and bottom carton flaps. As shown in FIGS. 8 to 10, staples may be applied to straddle the longitudinal center line of the carton, be applied longitudinally of the carton and to one side of the longitudinal center line thereof, or be applied longitudinally of and adjacent one side margin of the carton. These three conditions are referred to successively as "Center Slot Cartons," "Partial Overlap Cartons" and "Full Overlap Cartons."

A comparison of FIG. 8 with FIGS. 9 and 10 indicates the cartons referred to as "center slot" may be stapled with the upper and lower stapling mechanisms located at the longitudinal center line of base 1 of the mechanism. However, in order to enable the side belts 74 to position the longitudinal center line of the carton to one side of the center line of the base 1, the clamps 83 must be manually adjusted. Additionally, the head of the stapling guns must also be shifted.

Figure 12:
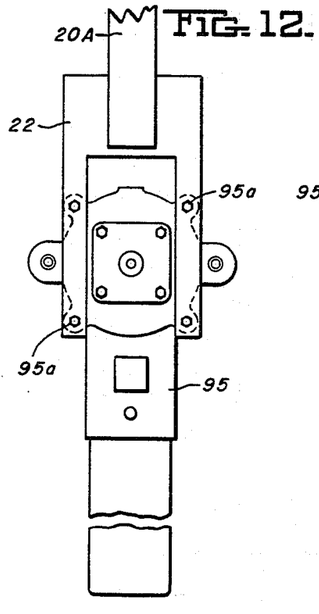
Figure 13:
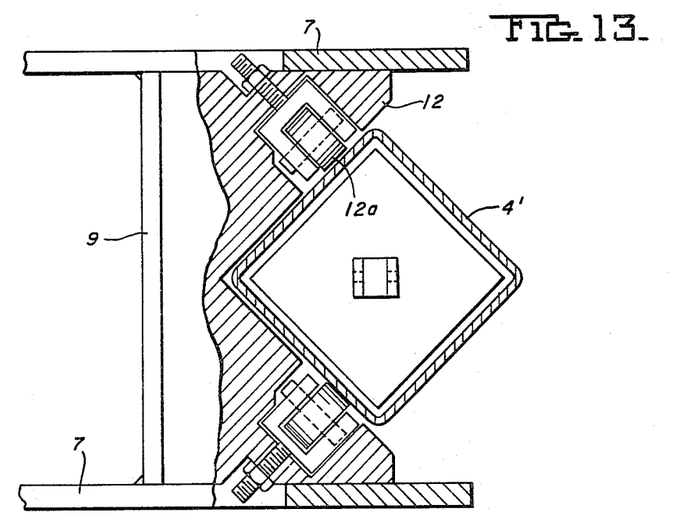
FIG. 13 shows a section through a column illustrating mounting of the bridge thereon.

Referring now to FIGS. 1, 3, 6, 11 and 12; the carriage 5 is provided with a forwardly extending member 20 upon the outer end of which is a stapling gun mounting plate 22. When the staples are applied to a "center slot" carton the stapling gun 95 is mounted as in FIG. 11. When, however, the staples are to be applied to "partial overlap" or "full overlap" cartons the stapling gun must be mounted as shown in FIG. 12. This is accomplished by removing the bolts 95a from the mounting plate 22, turning the stapling mechanism 95 through an angle of 90 degrees and reapplying the bolts 95a. As shown in FIGS. 3 and 12, the stapling gun 95 upon its mounting plate 22 is supported by member 20 to position the staples over the center line of bed 1. By reason of the partial overlap and full overlap cartons requiring the staples to be applied rearwardly of the bed center line, the member 20a supporting the stapling gun is shortened a desired amount and the bottom gun 95b within the base is similarly shifted into alignment with the upper gun. This adjustment now applies the staples longitudinally of the carton and to the rear of the longitudinal center line of base 1. Correspondingly the belts 74 must be manually adjusted for either "partial" or "full" overlap cartons. Due to the modified form of side flaps, in these latter cartons, the side flap closure bar 34 must be correspondingly modified.

CARTON CENTERING, FLAP CLOSING AND STAPLING SEQUENCE

Referring now to FIGS. 1, 4 and 5 of the drawing; it will be first assumed that the apparatus is set for a run of a plurality of cartons of the same height. It will be further understood that under all conditions a single carton will be entirely processed through the apparatus before a subsequent carton will be entered therein. By way of example and not limitation, a single carton is processed through the apparatus, as shown, in between 6 to 10 seconds depending upon whether the cartons are of uniform or random sizes. This provides a production rate of about 350 to 500 cartons per hour. It will be understood that the centering and driving belts move together as each carton enters the apparatus and separate as each carton is moved to the discharge end of the apparatus.

Before a carton moves upon the rollers 2 of the base 1 of the apparatus, the apparatus is manually connected by switch 96a with a suitable source of electrical power. The carton in moving over the second roller 2a closes carton trip switch 96 (FIGURE 4) which in turn opens solenoid actuated belt drive valve 97 and centering device valve 98 (FIGURE 16) starting belt drive motors 94 and cylinder 81 (FIG. 4) closes the driving belts upon the entering carton carrying it forward. The front center flap 1a of the advancing carton moving beneath, without engaging, the height sensing arm 35 engages the flap 72 depending therefrom moving it upwardly into engagement with lock switch 103. The switch thus closes as the flap 72 moves into offset portion 30 of member 29 and folded flap 1a moves thereunder. In this manner the carriage lowering or down switch 102 is rendered inoperative before engagement by the advancing carton. Continued advancement of the carton causes the trailing end thereof to move off the rear flap closure switch 104 which in turn closes to energize cylinder 49 advancing piston 50 therein to move chain 53 and driving sprocket 47 attached to arm 36 and causing counter-clockwise rotation thereof carrying arm 36 rearwardly about its pivot 46. Rotation of arm 36 continues until flap 57 thereon engages the upstanding rear end flap of the carton and cylinder 62 actuates flap 57 to close folding the carton flap inwardly. At this point the advancing piston 50 engages and closes rear limit switch 105 (FIGURE 16) at the end of advance of piston 50. The advancing carton then moves its rear end flap under bar 29 which maintains both carton end flaps closed. Thereafter exhaustion of air from cylinder 49 causes retraction of closure arm 36 to initial position and cylinder 62 returns flap 57 to its original position. As the advancing carton moves forward its side flaps are carried under and along side flap closure arms 34, which folds the carton side flaps over the end flaps. The advancing carton then moves beneath member 32. The leading edge of the advancing carton now trips staple positioning switch 107 stopping the side belts 74 and activating the upper and lower stapling mechanisms 95, 95b to apply a staple across the side flaps and into the front end flap adjacent the leading end edge of the carton. As the carton continues to advance it trips staple positioning switch 111 stopping belts 74 and causing activation of the upper and lower stapling mechanisms 95 and 95b to apply a second staple across the side flap and into the underlying end flap adjacent the trailing edge thereof. Continued advancement of the carton causes its trailing edge to move successively off staple positioning switches 112 and 113 to stop belts 74 and activate the upper and lower stapling mechanisms 95 to apply staples across the side flaps into the underlying rear end flap, first inwardly of the leading edge of said flap and then adjacent the trailing edge of the carton. The leading edge of the carton having depressed centering device switch 114, the trailing edge of the carton as it leaves the switch 114 permits it to move outwardly and activate cylinder 81 to separate the belts 74 permitting the carton to be removed from the rollers 2. Outward movement of switch 114 permits a succeeding advancing carton to again depress the roller 2a and carton trip switch 96 to again activate cylinder 81 to close side belts 74 upon the succeeding carton to repeat the above described sequences.

Figure 7:
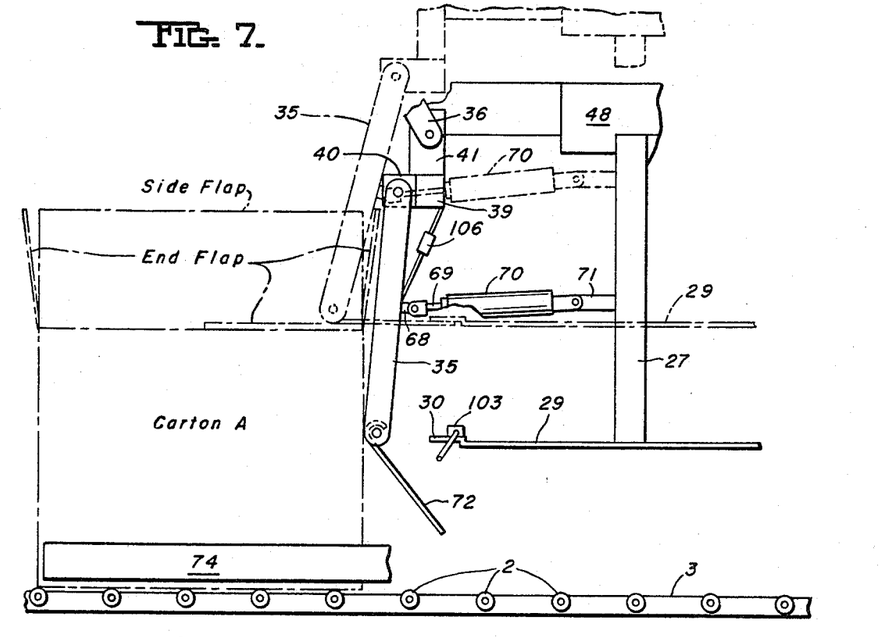
FIG. 7 is a schematic view illustrating automatic adjusting means for raising and lowering the bridge to accommodate varying carton heights.

Referring now to FIGS. 1 and 7; the entering carton A being moved by belts 74, advances into engagement with the body of member 35 causing inward rotation of arm 35 into substantially a vertical position and depressing piston 69 of air cylinder 70. This position of arm 35 closes up switch 106. Closing the up switch 106 stops belts 74 and activates the cylinder 15 to raise the bridge 5 and arm 35 upwardly until the carton moving beneath the bottom of arm 35 advances flap 72 upwardly into engagement with lock switch 103. The raising, or advancing, of flap 72 is accelerated by cylinder 70, whose piston was depressed during raising of the bridge, again moving arm 35 to its original position as shown in in phantom lines in FIGURE 7 after pressure is relieved as arm 35 moves over the top of the carton body. Thus the lock switch 103 deactivates cylinder 15 and locks out movement of the bridge 5 downwardly, before the leading face of the carton depresses down switch 102. Thereafter continued movement of the carton longitudinally of base 1, by belts 74, will cause activation of the rear flap closure arm 36 and flap 57 along with the staple positioning switches to complete closure and securing of the carton flaps as previously described. The apparatus will continue to process the same height of cartons without further movement of bridge 5.

Referring again to FIG. 7 and assuming now a carton enters the apparatus and is of a height less than sufficient to move sensing arm flap 72 upward to close lock switch 103, such carton will advance to close the down switch 102. Closure of this switch 102 causes side belts 74 to be stopped and cylinder 15 to be activated and to lower the bridge 5 until the descending flap 72 pivots upon height sensing arm 35 and moves upwardly to close lock switch 103 and stopping descent of bridge 5. The advancing carton will then thereafter activate the previously described controls to close all the carton top flaps and apply the staples thereto before the belts 74 move the carton into engagement with centering device switch 114 which stops rotation of the belts and retracts the belts from the carton side faces. Thereafter the apparatus will continue to process cartons of this latter height, without movement of the bridge, until a higher or lower carton is presented to the height sensing arm 35.

WIRING DIAGRAM

Figure 16:
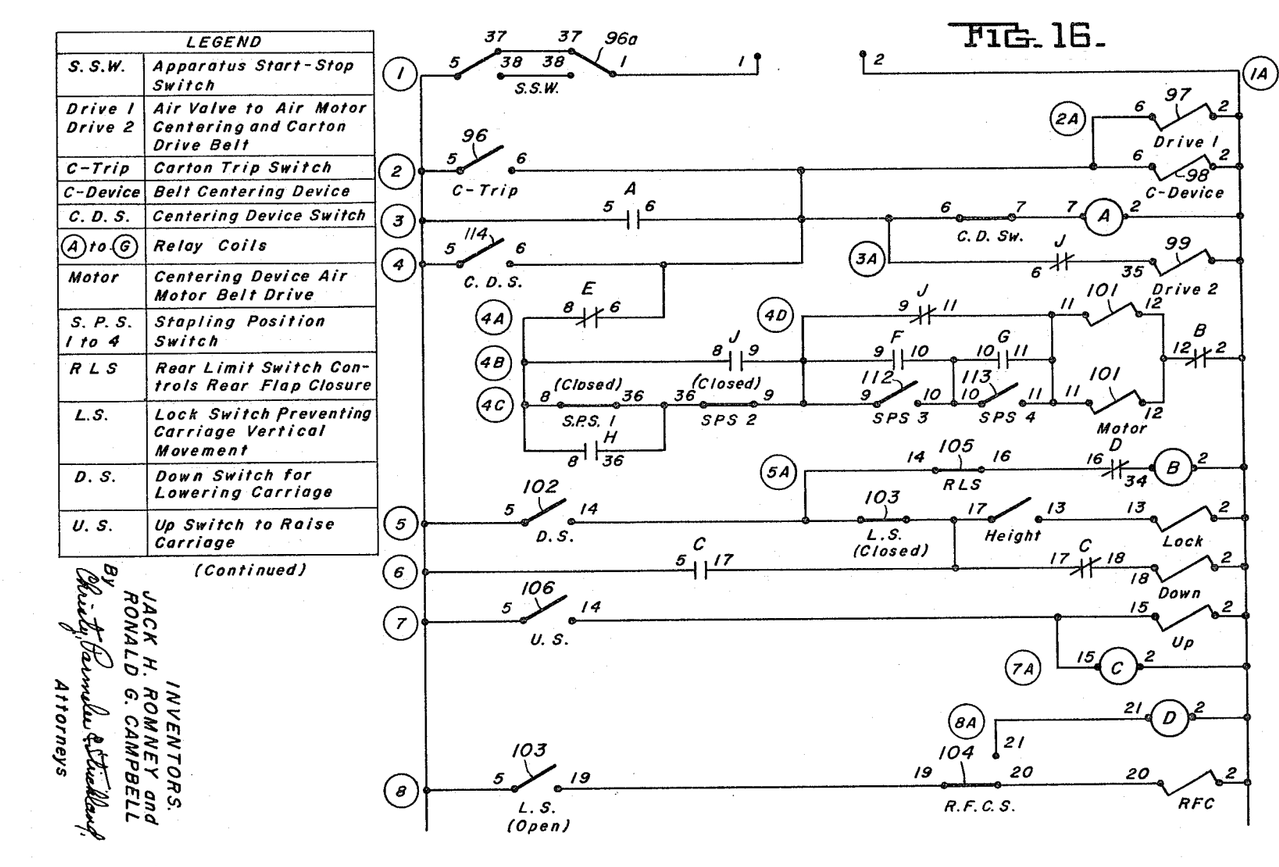
FIG. 16 shows a wiring diagram for electrical operation of the apparatus.
Figure 16A:
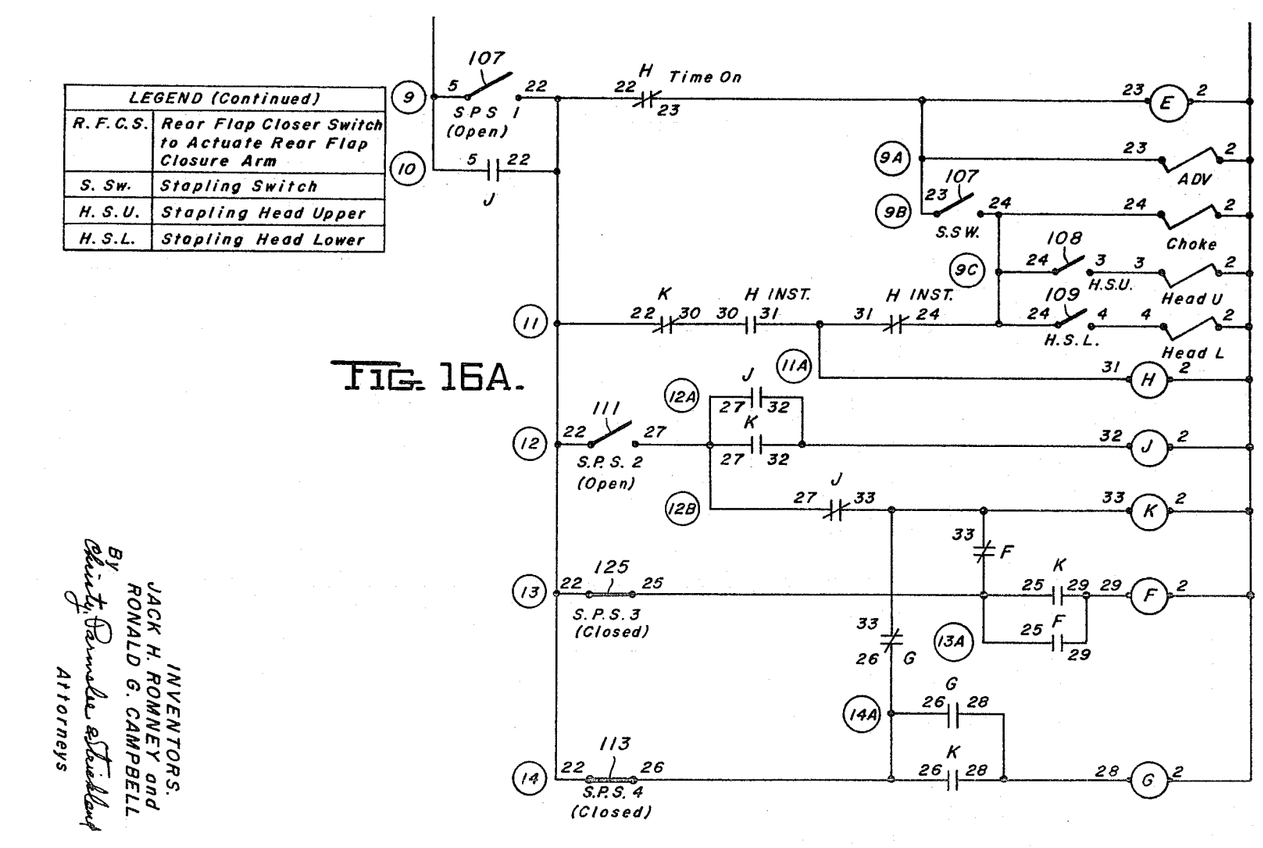

Referring now to FIGS. 16 and 16a of the drawing wherein the electrical circuitry and sequence of operation is shown by a typical ladder type diagram, the cross lines of which are numbered (1 to 14), wherein:

(1), (1A) indicates inlet lines from a 110 volt, 60 cycle A.C. power source with manually operated switch 96a to start and stop apparatus from either end of the bed thereof;

(2) illustrates closing of carton trip switch 96 by entering carton and opening belt drive valve 97 and centering device air valve 98 providing air for operation of these mechanisms;

(3) illustrates concurrent activation of relay coil (A) by (2) closing of previously open switch 96 and (3A) indicates opening of the second drive motor valve 99 supplying air to the drive motor;

(4A), (4C) and (4D) activates motor 101 to drive carton conveying belts and actuate centering device valve 98 to move belts to engage entering carton and move it forward;

(5) illustrates closing of down switch 102 by moving carton and actuation of relay (B). The lowering carriage 5 moves downwardly until flap 72 engages carton flap and moves upwardly to close lock switch 103 locking out further downward movement of carriage 5 and carton moves forward off rear flap closure switch 104 causing it to close. This actuates cylinder 49 to move rear flap closure assembly 36 to close rear flap and at completion thereof closing rear limit switch 105 starting forward movement of the carton.

(7) illustrates closing of up switch 106 upon entering carton striking height sensing assembly 35 and moving same inwardly to close up switch 106 causing bridge 5 to rise until moving carton passes under the height sensing element 35 and moves flap 72 into engagement with and closing lock switch 103. As this sequence is completed the carton moving past rear flap closure switch 104 causes same to actuate the rear flap closure assembly as before.

(8) illustrates a condiiton when the bridge is positioned to cause moving carton to merely engage flap 72 and close lock switch 103, when the carton thereafter moving over switch 104 closes same to actuate the rear flap closure assembly 36 as before.

(5), (7) and (8) sequences have closed relay (C) and/or (D) and the carton has moved forward under side flap closure member 34 effecting closure of the carton side flaps. The carton is now ready for stapling.

(9) illustrates carton advance to engage carton front edge with staple positioning switch 107 closing same to also close relay (E). Switch 107 acting through (9A), (9B), (9C) and the right half of leg (11) to actuate the top and bottom stapling heads to drive stapler 95 (FIG. 1) by closing switch 108 and 109. Acting through (11A) relay (H) is closed.

(12) illustrates the advancing carton closing staple positioning switch 111, closing relay (J) and concurrent actuation of the upper and lower stapling heads to drive staple No. 2 (FIG. 1).

(13) illustrates rear edge of carton moving off staple positioning switch 112 actuating same to close relay (K) and (F) and to actuate driving of staple No. 3 (FIG. 1).

(14) illustrates the rear edge of the carton moving off staple positioning switch 113 closing relay (G) and actuating the upper and lower stapling heads to drive staple No. 4 (FIG. 1). As the carton thereafter moves forward it actuates switch 114 to open the driving belts and stop rotation thereof until a following carton engages the carton trip switch 96 to repeat the cycle.

PNEUMATIC-HYDRAULIC SYSTEM

Figure 17:
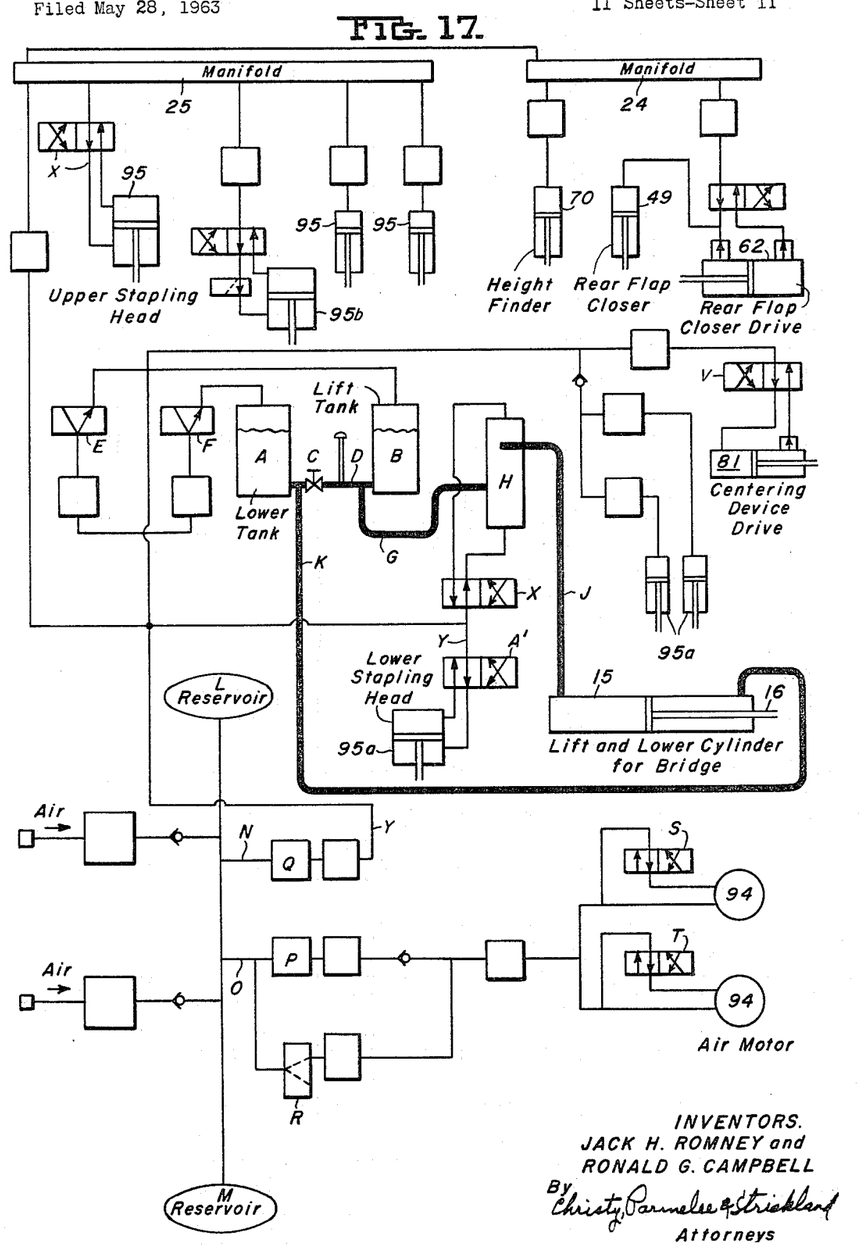
FIG. 17 shows a hydraulic-pneumatic diagram for operation of the apparatus.

Referring now to FIG. 17 of the drawing wherein a schematic arrangement of the pneumatic-hydraulic systems are shown, it will be understood that the heavy lines refer solely to the oil (hydraulic) operation of the cylinder 15 and piston 16 which raises and lowers the bridge 5 according to carton height. The lighter lines indicate the air lines feeding and controlling operation of the remaining moving parts of the apparatus of the invention. The regulators and the solenoid valves of the wiring diagram are similarly numbered here and in the wiring diagram.

Referring first to the heavy black lines carrying oil, lowering tank A and lifting tank B are partially filled with oil, above which is air. A manually operated valve gate C in line D connects tanks A and B. When solenoid valves E and F are closed the tanks A and B are in equilibrium with line G connecting oil in B with oil in hydraulic valve H and through line J with one side of piston in hydraulic cylinder 15. Similarly oil in tank A is connected through line K with hydraulic cylinder 15 at the opposite side of the piston. When piston 16 in cylinder 15 is moved inwardly to lwer the bridge 5, valve E exhausts air from B permitting oil to flow into B out of cylinder 15, behind piston, and valve F is normally open to increase air in A passing oil above cylinder 15 piston lowering the bridge 5. Similarly to raise bridge 5 air is exhausted from A causing oil to enter cylinder behind the piston causing piston rod 16 to rise and consequently raising bridge 5.

Referring now to the light black lines; air entering the system at the left fills reservoir tanks L and M from which it passes into lines W and O to lower pressure regulators P and Q, likewise air passes from O to closed solenoid actuated valve R. Air from Q, passing through adjacent lubricator enters line Y and moving upward pressurizes manifolds 24 and 25. When a carton enters the machine and closes switch 96 drive solenoid valves R, S and T are opened driving air motors 94 and belts 74. The carton trip valve V being closed, air cylinder 81 is actuated to start belts closing upon entering carton and moving it towards height sensing arm 35. Should height sensing arm 35 be positioned for the height of the entering carton, flap 72 thereon moves upwardly from engaging with the front end flap and closes lock switch 103, advancing carton then moves off rear flap closure switch 104, opens actuating in sequence rear flap closure cylinder 49 and cylinder 62 to close carton rear flap. The carton front and end flaps being closed move under member 29 and held down until side flaps are closed by closure bar 34.

As the carton moves forwardly and the leading face closes staple positioning switch 107 the upper stapling head actuated through valves X, Y and Z positions and drives the upper stapler 95. Concurrently, lower stapling head 95b is actuated by solenoid A' for the same purpose. This sequence is repeated as staple position switch 111 is closed and staple position switches 112 and 113 are closed. As the carton moves forward and trips centering device switch 114 the air motors are shut off and the center device drive cylinder 81 is reversed to separate the belts 74 to receive the succeeding carton.

The preceding recital of details of construction describes apparatus as built and successfully operated. It will be understood that each of the details of construction are for the purpose of illustration and not limitation, except where made necessary by the following claims.

The stapling guns or mechanisms form no part of the present invention as they are presently commercially available and covered by patents owned by the assignee herein, International Staple and Machine Company.

Although the carton sealing means employed herein are staples, it will be understood that other forms of sealing means such as tapes and glue may be employed. In such latter cases, the general appearance of the apparatus may be substantially varied while still employing the height sensing mechanism, flap closure devices and carton centering and/or driving belts. Such mechanisms, or their mechanical equivalents, appear to be necessary for automatic operation with variable carton sizes.

We claim:
1. In an apparatus for closing and sealing the flaps of a carton moving therethrough, the combination of
   (a) a base for supporting said carton and moving same longitudinally of the base,
   (b) a bridge member disposed in longitudinal spaced relation to said base,
   (c) a member mounted upon said bridge member and depending from one end thereof in the path of a carton having upstanding end and side flaps and moving over said base,
   (d) a pivotally mounted bottom flap on said depending member for engaging and closing the end flap on the leading edge of said moving carton,
   (e) a member pivotally mounted upon said bridge and extending upwardly from the end thereof,
   (f) a flap pivotally mounted upon the outer end of said upwardly extending member and means on the member for imparting rotary movement to said flap,
   (g) means on said bridge for imparting selective outwardly and downwardly movement to said pivotally mounted upwardly extending member,
   (h) means on said base actuated by the trailing edge of said moving carton for activating said means on the bridge to rotate said pivotally mounted member downward to close the rear end flap of said carton moving thereunder,
   (j) a member mounted upon said bridge and extending longitudinally of the path of movement of said carton for engaging said closed carton front and rear flaps in their closed position,
   (k) means on said bridge for engaging and closing the open side flaps of the carton moving thereunder,
   (l) means on said bridge for engaging said closed side flaps and holding them in closed position as the carton moves free of said member holding the end flap in closed position,
   (m) means on said bridge for sealing said closed side flap in closed position, and
   (n) means on said base for selective engagement by the moving carton to activate said flap sealing means on said bridge to seal the carton flaps in closed position.

2. The apparatus as defined in claim 1, wherein said sealing means on said bridge comprises a stapling head applying spaced staples to the carton flap as the carton moves thereunder.

3. The apparatus as defined in claim 1 wherein the bottom flaps of the carton entering upon the base are closed but not sealed, opposing stapling heads are mounted upon the bridge and base, and the means on said base selectively engaged by the moving carton activates the stapling heads to simultaneously drive staples into the carton top and bottom flaps of the carton moving thereunder.

4. The apparatus as defined in claim 1, wherein
   (a) the member mounted upon and depending from the bridge in the path of the moving carton is pivotally connected to the bridge, (b) said pivotally mounted depending member when engaged by a carton of greater height than the preceding carton pivots with said carton, (c) means on said bridge engaged by said pivoting member for activating means on the base for raising the bridge and pivoted member to a height permitting the pivoted member to return to normal position and its bottom mounted flap to engage and close the end flap of the leading edge of the carton.

5. The apparatus as defined in claim 4, wherein means mounted on the base in the path of movement of a carton, too low for engagement by said pivoted member or its flap, activates means for lowering said bridge until said pivoted member flap engages and closes said carton leading edge end flap.

6. Apparatus for automatically sealing the open top flaps of a carton passing therethrough, comprising (a) a bed portion supporting a carton moving thereover, (b) a bridge member disposed longitudinally above at least a portion of said carton supporting bed, (c) means associated with said bed and supporting said bridge member for vertical reciprocal movement relative to a carton body with open top flaps moving over said bed, (d) means on said bridge member for automatically and sequentially sensing the height of a carton body moving thereunder and applying sealing means thereto, and (e) said height sensing member when engaged by the body portion of a moving carton being displaced to actuate said bridge supporting means to raise the bridge and the height sensing member above a position for contact by said carton.

7. In apparatus for receiving and stapling top and bottom flaps of a packed carton, said apparatus having means for receiving and supporting the carton during passage through the apparatus and means for simultaneously stapling the carton top and bottom flaps, the improvement in means for sensing the height of an entering carton which comprises, (a) a carriage member extending longitudinally of the direction of movement of the carton, (b) bridge supporting means mounted upon said carton supporting means adjacent opposite ends of the carriage member upon which the carriage member has vertical reciprocal movement, (c) means disposed intermediate the ends of the carriage for moving said carriage relative to said supports, (d) a member disposed longitudinally of one side of said carriage and positioned to overlie the end flap at the leading edge of a carton moving thereunder, (e) a height sensing member pivotally mounted upon the carriage and normally depending downwardly and outwardly from the carriage and outwardly of the said member positioned to overlie said end flap, (f) inwardly deflectable means for normally holding said pivotally mounted height sensing member in normal position, (g) a member pivotally mounted upon the lower end of said height sensing member and normally depending by gravity therefrom, and (h) switch means mounted upon said carriage and upon said means supporting the carton whereby deflection of the height sensing arm by the entering carton actuates the carriage mounted switch to raise the carriage and actuation of the switch on the carton supporting means by the entering carton causes lowering of the carriage.

8. In apparatus for sealing the flaps of a carton, the combination of (a) a longitudinally extending base having a plurality of laterally extending and longitudinally spaced carton supporting members thereon, (b) guides beneath said carton supporting members and extending transversely of the base, (c) slides on said guides spaced from each other and movable on the guides transversely of the base, (d) supports mounted on the slides and extending vertically upward between the carton supporting members, (e) endless belts extending longitudinally of the base and on opposite sides of the base and above said carton supporting members, (f) belt pulleys and motor drives therefor mounted on said supports for movement therewith transversely of the base, (g) sprockets on opposite sides of said base for guiding sprocket chains for movement transversely of the base, (h) means for securing the slides to said sprocket chains, and (i) means for moving said sprocket chains in opposite directions to move said belts towards and away from each other.

9. Apparatus for sealing the flaps of a carton as described in claim 8 in which the means for securing the slides to the chains are releasable to adjust the position of the slides along the chains.

References Cited by the Examiner

UNITED STATES PATENTS

| | | | |
|---|---|---|---|
| 2,324,401 | 7/1943 | Kimball | 53—75 |
| 2,550,928 | 5/1951 | Kay | 53—75 |
| 3,043,418 | 7/1962 | Morrison et al. | 198—165 X |
| 3,045,402 | 7/1962 | Keely et al. | |
| 3,085,376 | 4/1963 | Ferguson et al. | 53—75 |
| 3,126,685 | 3/1964 | Paxton et al. | |

TRAVIS S. McGEHEE, *Primary Examiner.*